(12) United States Patent
Kline (10) Patent No.: US 9,931,784 B2
(45) Date of Patent: Apr. 3, 2018

(54) 3D PRINTING PART REMOVAL AND INTERFACE FOR A 3D PRINTING VENDING MACHINE

(71) Applicant: Kevin D. Kline, Newport News, VA (US)

(72) Inventor: Kevin D. Kline, Newport News, VA (US)

(73) Assignee: VIRGINIA TECH INTELLECTUAL PROPERTIES, INC., Blacksburg, VA (US)

(*) Notice: Subject to any disclaimer, the term of this patent is extended or adjusted under 35 U.S.C. 154(b) by 304 days.

(21) Appl. No.: 14/702,159

(22) Filed: May 1, 2015

(65) Prior Publication Data
US 2015/0314527 A1    Nov. 5, 2015

Related U.S. Application Data

(60) Provisional application No. 61/987,942, filed on May 2, 2014, provisional application No. 61/987,936, filed on May 2, 2014.

(51) Int. Cl.
| | |
|---|---|
| B29C 67/00 | (2017.01) |
| B29C 64/106 | (2017.01) |
| B33Y 40/00 | (2015.01) |
| B29C 64/00 | (2017.01) |
| B33Y 30/00 | (2015.01) |
| B29L 9/00 | (2006.01) |

(52) U.S. Cl.
CPC .......... *B29C 64/106* (2017.08); *B29C 64/00* (2017.08); *B33Y 40/00* (2014.12); *B29L 2009/00* (2013.01); *B33Y 30/00* (2014.12)

(58) Field of Classification Search
CPC .......... B29C 67/0055; B29C 67/0085; B29C 67/0096
See application file for complete search history.

(56) References Cited

U.S. PATENT DOCUMENTS

| | | | |
|---|---|---|---|
| 2007/0241482 A1* | 10/2007 | Giller | B29C 67/0066 264/494 |
| 2010/0217429 A1* | 8/2010 | Kritchman | B29C 67/0055 700/119 |

* cited by examiner

*Primary Examiner* — Timothy Kennedy
(74) *Attorney, Agent, or Firm* — Keith A. Vogt; Vogt IP (57) ABSTRACT

The present invention concerns a system and method for fabricating a three-dimensional object. A build platform is provided that defines a build area and includes a print bed within the build area. Also provided is an extruder that extrudes build material. An ejector having at least one arm that has at least two opposing ends is used to remove the printed object. The first end of the ejector is adapted to travel in a vertical direction and the second end is adapted to travel in a horizontal direction. A scraper portion extends horizontally, parallel to the print bed from a retracted position to an extended position when the first end travels in a vertical direction towards the print bed.

20 Claims, 13 Drawing Sheets

FIG. 13

3D PRINTING PART REMOVAL AND INTERFACE FOR A 3D PRINTING VENDING MACHINE

RELATED APPLICATIONS

This application claims the benefit of U.S. Provisional Application No. 61/987,942 filed May 2, 2014 and the benefit of U.S. Provisional Application No. 61/987,936 filed May 2, 2014 both of which are herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

The present invention relates to the field of additive manufacturing (3D printing). While there are a number of acceptable 3D printer designs currently, there remains room for improvement. For example, current designs lack portability as a result of being designed to be operational in stationary locations.

Current designs are also unreliable. It is not uncommon to have print jams caused by clogged extruders, unreliable heating elements, improper layer height calibration and failures in the movement of the printing head caused by jammed carriages and the like.

Current designs also lack a reliable means to provide a user access to a printed part while preventing access to the working parts of the printer.

BRIEF SUMMARY OF THE INVENTION

In one embodiment, the present invention relates to assemblies that automatically remove printed components to permit the continuous and automatic manufacturing of additional components.

In one embodiment, the present invention provides a design that consists of a compact, parallel kinematic linkage that transfers rotary or linear motion into horizontal movement across a substrate in which an additive manufactured part is created in a build area or working volume of the machine.

In yet another embodiment, the present invention provides a printer that is highly modular, reliable, and portable.

In another embodiment, the present invention provides an ejection mechanism in which completed parts may be automatically removed from the build platform after the print is completed.

In additional embodiments, the present invention provides designs that help prevent injury to a user.

In additional embodiments, the present invention provides designs that protect the internal working mechanisms of the printer from tampering or damage.

In further embodiments, the present invention provides a unique interface for use with 3D printing machines.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is also to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
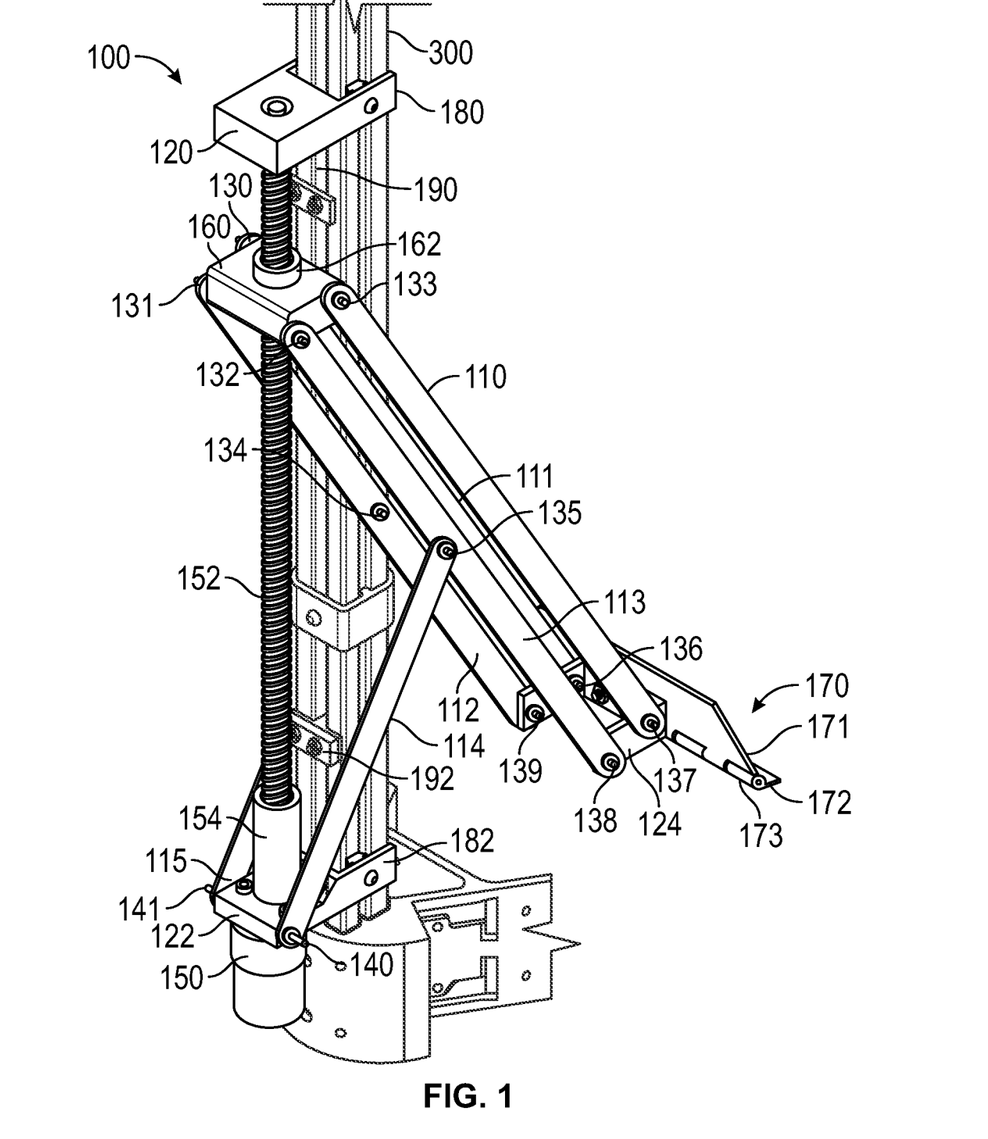
FIG. 1 illustrates an ejection mechanism that may be used with one embodiment of the present invention.

In one embodiment, as shown in FIG. 1, the present invention provides an ejection mechanism or assembly 100 for the automatic removal of a part created through the use of additive manufacturing (3D printing). Ejection mechanism 100 may mounted to post 300 and consist of compact, parallel kinematic linkage arms 110-115 that may be spaced apart to create a gap in between the arms. The arms are attached to base 122, bracket 124 and carriage follower 160 by pivot connection points or pins 130-141.

A motor 150 drives rotating screw 152 via coupler 154. Bases 120 and 122 make up the vertical ends and retain screw 152 as well as other components of the assembly as shown. As is also illustrated, screw 152 drives follower 160 via threaded engagement with internal threaded portion 162. In a preferred embodiment, mechanism 100 utilizes a vertical lead screw 152 attached to a 12 v motor 150 to provide linear motion to a follower carriage 160 that is connected to four parallel links or arms 110-113. The links, in turn, are connected to a hinged plow 170 that travels along the printing surface to remove a part. A second set of links or arms 114 and 115 are connected by a pin joint in the center of the linkage to ensure that vertical motion at one end of the parallel links transfers to horizontal motion at the other. The system can be operated between a retracted, compact position and extended position.

Figure 2A:
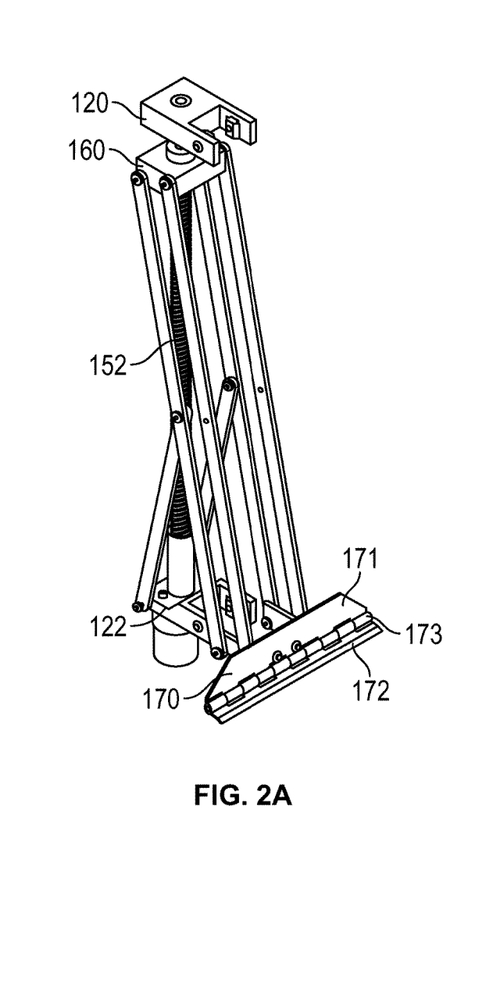
FIG. 2A illustrates the ejection mechanism shown in FIG. 1 in a retracted position.
Figure 2B:
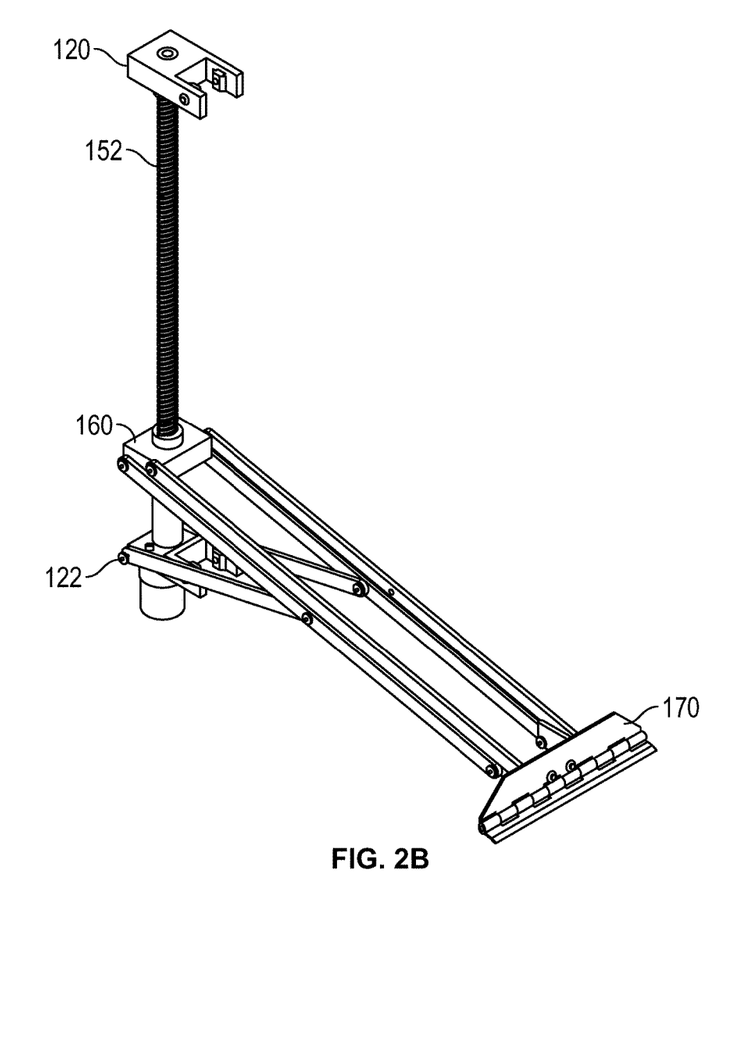
FIG. 2B illustrates the ejection mechanism shown in FIG. 1 in an extended position.

In yet another embodiment, as shown in FIGS. 2A and 2B, the rotation of screw 152 and its interaction with follower 160 results in driving plow 170 between a retracted position (FIG. 2A) and an extended position (FIG. 2B). When screw 152 is rotated in one direction, follower 160 is driven towards bracket 122. When screw 152 is rotated in the opposite direction, follower 160 is driven towards bracket 120. As is also illustrated, the vertical movement of follower 160 results in the horizontal movement of plow 170 by arms 112-115 which translate the vertical movement of follower 160 into horizontal movement. Arms 110 and 111 assist in keeping plow 170 a fixed distance from the printing surface.

Electrical end-stops 190 and 192 and a controller (not shown) provide the control needed to extend and retract the plow. When a part is to be removed, a controller sends a signal which causes motor 150 to drive follower toward base 122 and upon triggering end-stop 192, which may be a contact switch, operation of motor 150 is stopped. Thereafter, the controller may cause the motor to rotate screw in the opposite direction to drive follower 160 towards base 120 until end-stop 190 is activated thereby ceasing operation of the motor. A short 5-second delay may be added to each change in direction to give the motor time to dissipate the inductive loads through a freewheeling diode.

Figure 3:
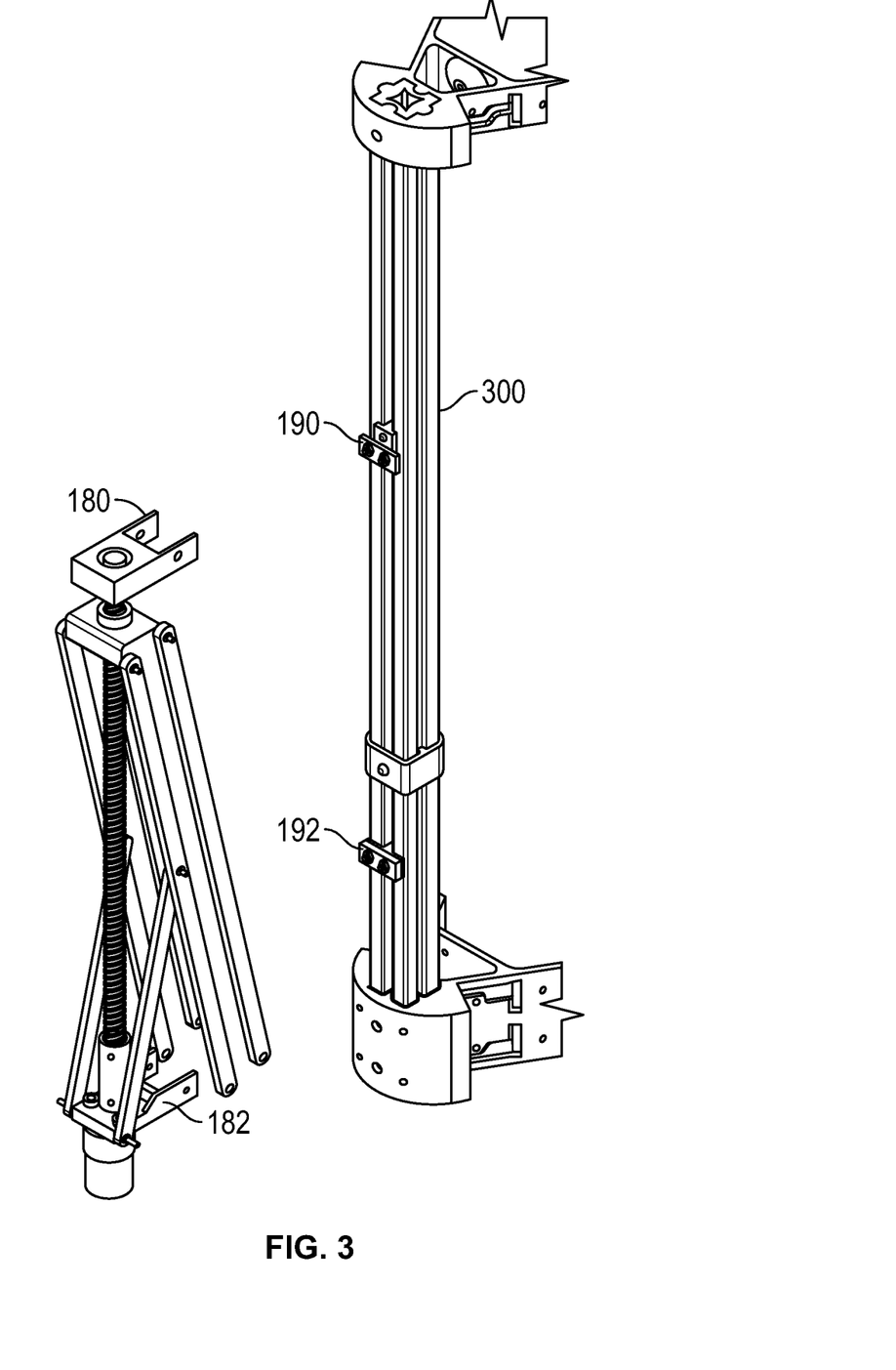
FIG. 3 is an exploded view of a structural support and the ejection mechanism shown in FIG. 1.
Figure 4A:
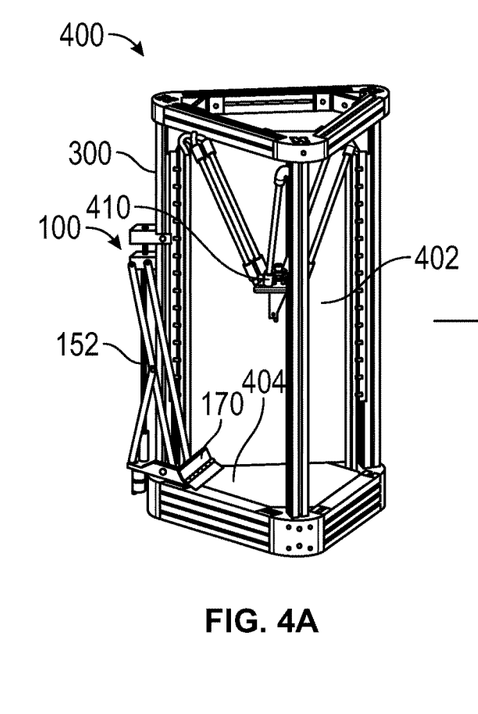
FIGS. 4A-4C illustrate an ejection process that may be used with an embodiment of the present invention.
Figure 4B:
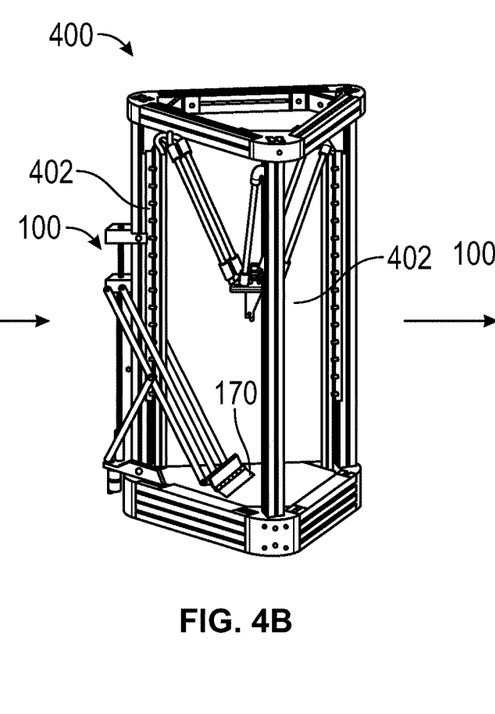
Figure 4C:
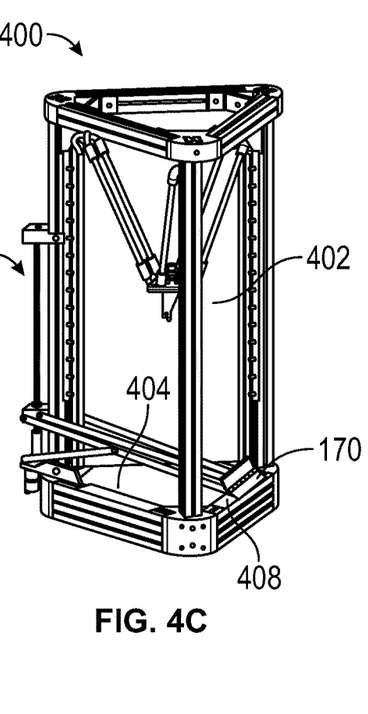

As shown in FIGS. 1 and 3, U-shaped brackets 180 and 182 connect mechanism 100 to support 300. As shown in FIGS. 4A-4C, assembly 100 is attached to printer 400. Printer 400 includes a build area 402 having therein a substantial planar build platform or print bed 404 and an extruder connected to an x-y-z positioning assembly 410. Printer 400 may also include a controller (not shown) that coordinates the fabrication of an object. For a Delta style printer, at least three vertical support posts encircle the build area as shown in FIG. 4A.

In yet another preferred embodiment of the present invention, the components of ejection assembly 100 that generate the vertical motion, such as motor 150, screw 152, and follower 160 as well as other components, are located outside of the build area 402. In a further embodiment, these components are vertically stacked along the outer edge of a support of Delta style printer as shown in FIGS. 3 and 4A. This embodiment is particularly suitable for use with Delta style printer 400 that typically has a non-rectangular and a taller footprint.

The compact nature of the design allows for an ejector to be located in a corner of the printer without the need for the assembly to extend horizontally a significant distance outside of the printer. In addition, by positioning screw 152, follower 160, and portions of the arms along the outer edge of a support, the horizontal footprint of the components is further minimized.

In addition, arms 110-115, which are used to translate the vertical motion of follower 160 into horizontal motion have a reduced horizontal footprint in the build area as shown in FIG. 4A. This is accomplished by configuring arms 110-115 to have a spaced apart arrangement that allows post 300 to be located inside an opening defined by the arms and plow 170.

The horizontal footprint is further reduced since the arms are in a generally vertical position (retracted position) during printing as shown in FIG. 4A. Even when deployed to remove a part, as shown in FIGS. 4B and 4C, one end of the arms extend horizontally while the other ends travel vertically and remain outside of the build area. This also minimizes the space within the printer that needs to be dedicated to the ejection mechanism. This, too, maximizes the amount of the footprint that may be devoted to the build area.

Arms 110 and 111 hold plow 170 a fixed distance above printing bed 404. As shown in FIG. 1 and FIG. 2A, plow 170 is comprised on a fixed portion 171 that is attached to the arms by bracket 124 and a moveable portion 172 connected to portion 171 by hinge 173. This arrangement allows portion 172 to rotate so as to maintain constant physical contact with bed 404 without the need for any other part of the assembly to contact bed 404. In yet another preferred embodiment, when the scraper extends past the build area, the movable portion of the scraper rotates into a vertical position.

FIGS. 4A-4C illustrate the method of operation of another embodiment of the invention. Either a linear vertical motion as described above powers the scraping device or a rotary actuator connected to at least one link may be used. The force is transferred to the part (not shown) using a pivoting or fixed scraping device in contact with the substrate or bed 404 to ensure full part removal and a consistent print surface for subsequent prints.

The constant physical contact of the scraper removes any material deposited on the bed. In addition, by extending scraper past the substrate, the rotatable portion of the scraper is allowed to pivot downwardly and drop any small objects caught on top of the blade. Alternatively, the blade could be manufactured short enough to prevent parts from being caught on the surface. The parallel linkage ensures that the pushing mechanisms remain oriented to the substrate in a predictable manner during the full stroke of the movement.

In another embodiment of the invention, the ejection process starts by a signal being sent to a controller indicating a print has finished. A 12 v fan (not shown) is then turned on under the print surface to help cool the glass print bed. In addition, the bed may include channels for the circulation of a cooling and heating fluid. This causes the plastic, such as PLS and ABS, to separate slightly from the glass or bed. Once the print bed has cooled adequately, the motor of the ejection mechanism is turned on and allowed to run until it triggers a limit switch. During this process, at least one arm with an attached plow, which is located in a substantially parallel vertical position with a vertical support of the printer, transitions from a vertical position into a substantially horizontal position that causes the plow or scraper to push the part off of the print surface and into a receptacle. The scraper may also extend past the build area to push the part off an edge which allows the movable portion of the scraper, if used, to rotate downwardly to drop any remaining parts or material. In another embodiment of the invention, the bed may include heating or cooling means, such as built-in channels for the circulation of a cooling and heating fluid.

In other embodiments, to transition from a retracted position to an extended position, the present invention provides an ejector having at least one arm having two opposing ends. The first end is adapted to travel in a vertical direction and the second end adapted to travel in a horizontal direction and may also include a scraper or plow portion. The second end extends horizontally, parallel to a print bed from a retracted position to an extended position when the first end travels in a vertical direction towards the print bed. As the second end travels horizontally, the part may be pulled or pushed into a predetermined area such as off an edge or into a receptacle. The operation is generally reversed when transitioning from an extended position to a retracted position.

Figure 5:
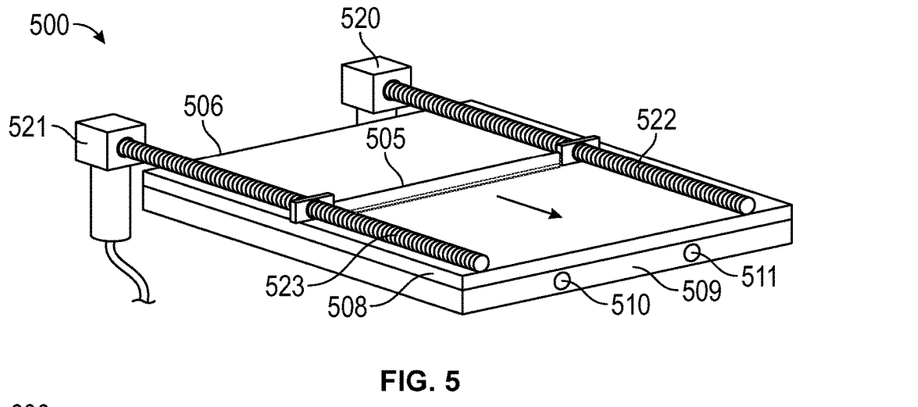
FIG. 5 illustrates an ejection mechanism that may be used with another embodiment of the present invention.

FIG. 5 illustrates another embodiment of the present invention. As shown, assembly 500 consists of scraper 505 and bed 506 which may be a composite of glass 508 and heated substrate 509. The bed may also contain one or more cooling and/or heating fluid channels 510-511. Scraper 505 is horizontally moved along bed 506 by motors 520 and 521, which drive lead screws 522 and 523.

Figure 6:
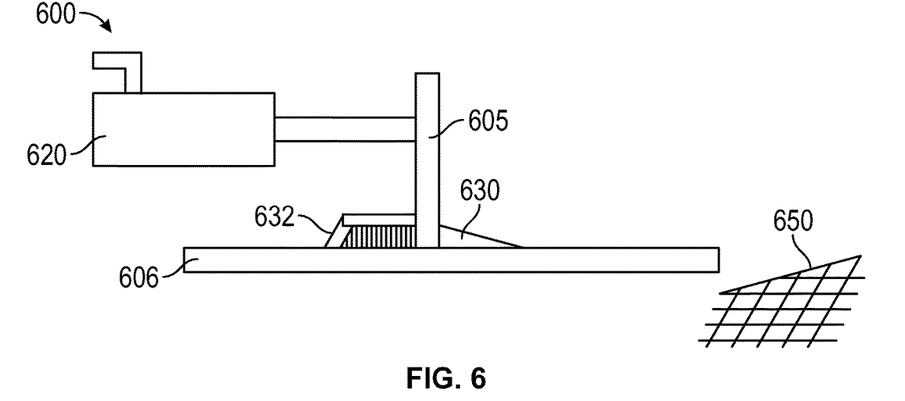
FIG. 6 illustrates an ejection mechanism that may be used with another embodiment of the present invention.

FIG. 6 illustrates another embodiment of the present invention. As shown, assembly 600 consists of scraper 605 and bed 606 which may be a composite of glass and heated substrate as described above. Scraper 605 is horizontally moved along the bed by pneumatic piston 620. Piston 620 may use a threaded screw as well to produce the horizontal movement. Scraper 605 may further include a rotatable hinge member 630 as described above as well as brush 632 for both removing the part and any excess material found on the bed. A net 650 may be used to receive the ejected part.

Figure 7:
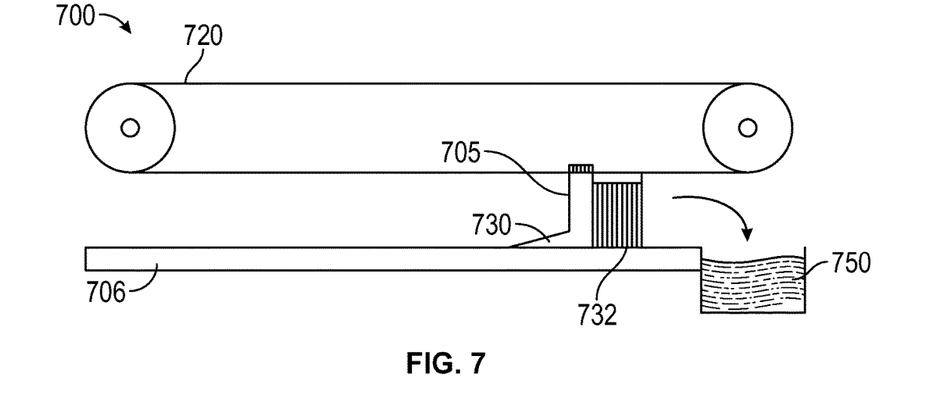
FIG. 7 illustrates an ejection mechanism that may be used with another embodiment of the present invention.

FIG. 7 illustrates another embodiment of the present invention. As shown, assembly 700 consists of scraper 705 and bed 706 which may be a composite of glass and heated substrate as described above. Belt assembly 720 horizontally moves scraper 705 along bed 706. Scraper 705 may further include a rotatable hinge member 730 as described above as well as brush 732 for both removing the part and any excess material found on the bed. A net or bin (not shown) may be used to retrieve the ejected part. In addition, for the embodiments using a brush, a reservoir 750 may be provided and located such that the brush is dipped into the solution and spreads resurfacing solution along the bed during operation of the scraper.

Figure 8A:
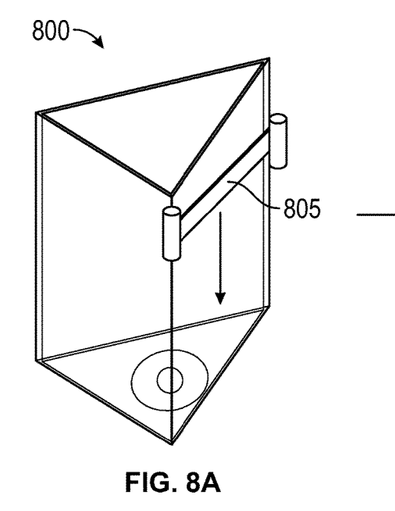
FIGS. 8A-8D illustrate an ejection mechanism that may be used with another embodiment of the present invention.
Figure 8B:
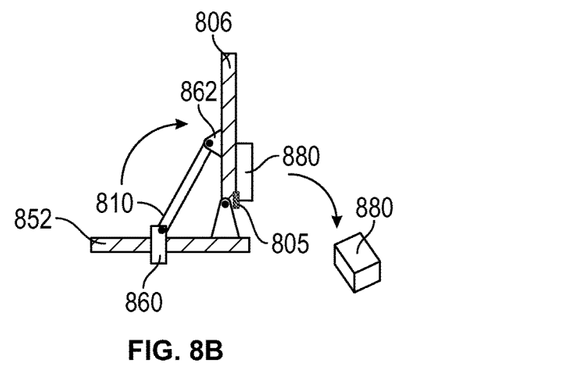
Figure 8C:
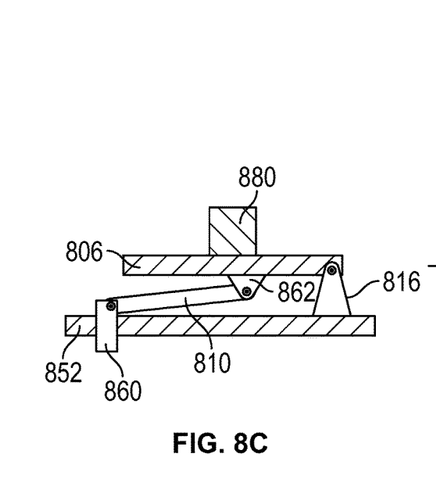
Figure 8D:
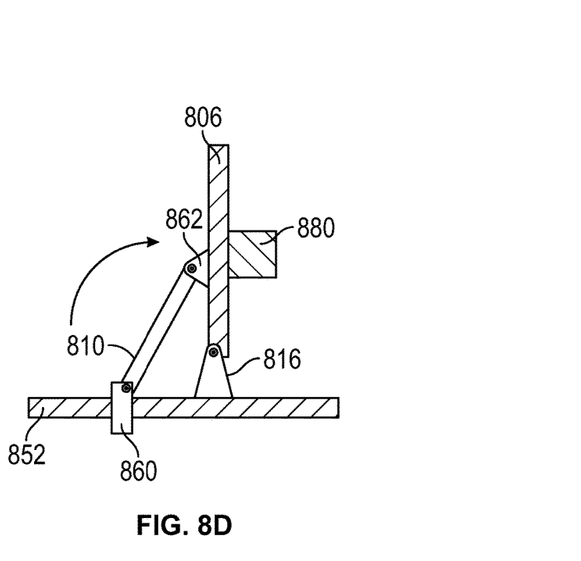

FIGS. 8A-8D illustrate another embodiment of the present invention. As shown, assembly 800 consists of scraper 805 and bed 806 which may be a composite of glass and heated substrate as described above. A belt or lead screw assembly as described above may move scraper 805 along bed 806 when the bed is extended into an ejection position as shown in FIGS. 8B and 8D.

As shown in FIGS. 8C and 8D a motor driven screw 852 drives follower 860 via threaded engagement with an internal threaded portion within follower 860. In a preferred ejection process, mechanism 800 utilizes lead screw 852 which may be attached to a 12 v motor to provide linear motion to follower carriage 860, which is pivotally connected to link 810. Link 810 is, in turn, connected to bed 806 by pivoting connection 862 and bed 806 is hinged or pivotally connected to stop 816.

Follower 860 is configured to travel from a position in which bed 806 is in a flat position as shown in FIG. 8C. When part 880 is to be ejected, screw 852 causes traveler 860 to move linearly which causes bed 806 to transition to a vertical position as a result of the connection to link 810 and stop 816. Once in the vertical position, as shown in FIGS. 8B and 8D, plow or blade 805 scrapes part 880 off of the bed. Electrical end-stops and a controller as described above may be provided to control the automatic operation of the bed and blade.

Figure 9:
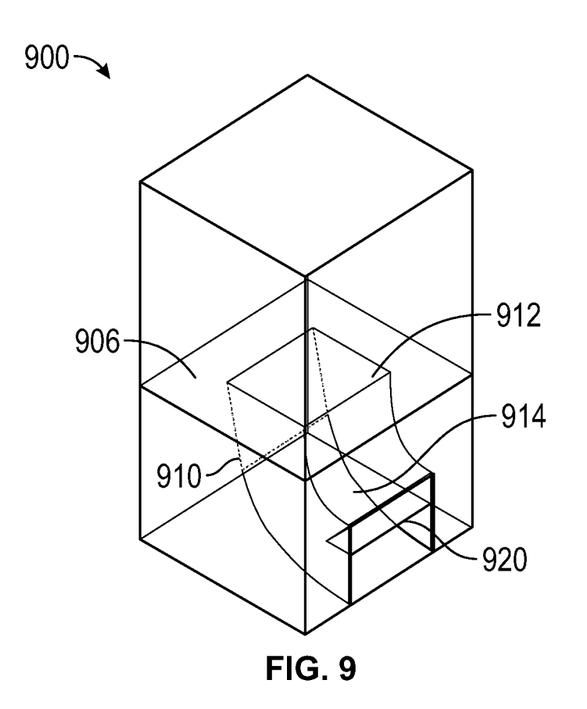
FIG. 9 illustrates an ejection mechanism that may be used with another embodiment of the present invention.

FIG. 9 illustrates another embodiment of the present invention. As shown, assembly 900 consists of bed 906 which may be a composite of glass and heated substrate as described above. However, via mechanical linkage the portion of bed 906 identified as 910 acts a trap door, which drops down to form opening 912 and then acts as a ramp 910 and 914 to deposit a part in bin 920 for retrieval.

Figure 10A:
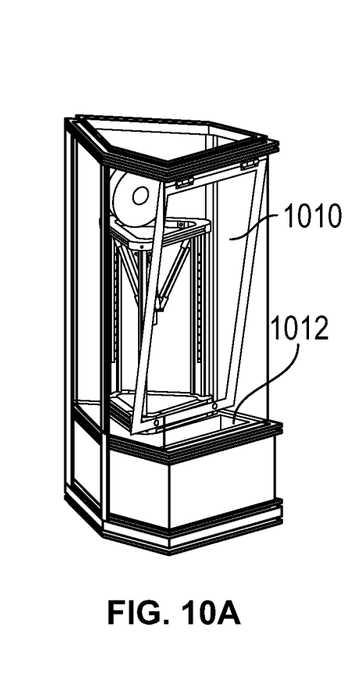
FIGS. 10A-10E illustrate how a modular unit of the present invention having a hinged door with mechanical end stops allows access to the part retrieval bin while providing controlled access to the printer.
Figure 10B:
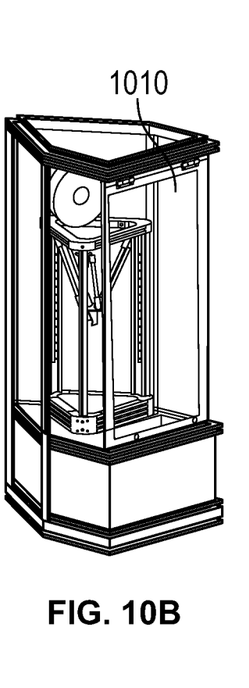

In yet another embodiment, as shown in FIGS. 10A-10E, a hinged panel 1010 and bin 1012 with mechanical end stops 1020 and 1021 provide a user access to collection location 1030 when panel 1010 is transitioned from a closed position as shown in FIG. 10B to an open position as shown in FIG. 10A. In this position, access to the working components of the printer is restricted.

In use, panel 1010 can be unlocked and pivoted inwardly towards the build area to allow access to part container 1030. Stops 1020 and 1021 position panel 1010 in a position to prevent access to the build area while providing access to the part.

Figure 10C:
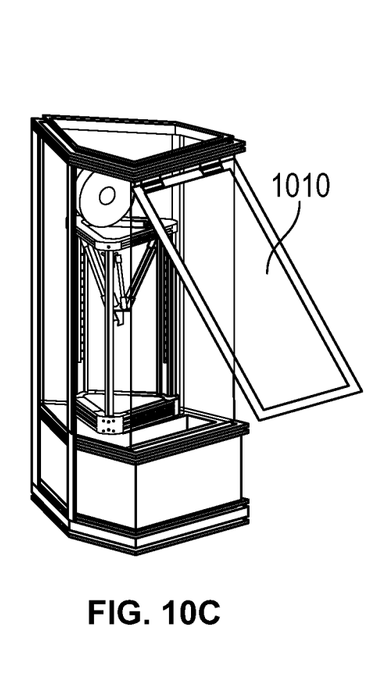
Figure 10D:
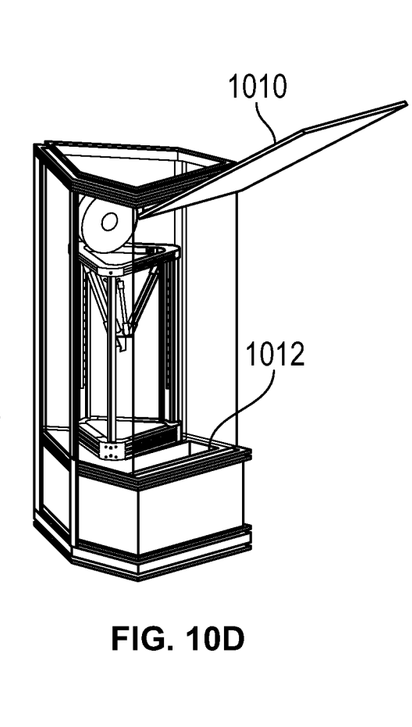
Figure 10E:
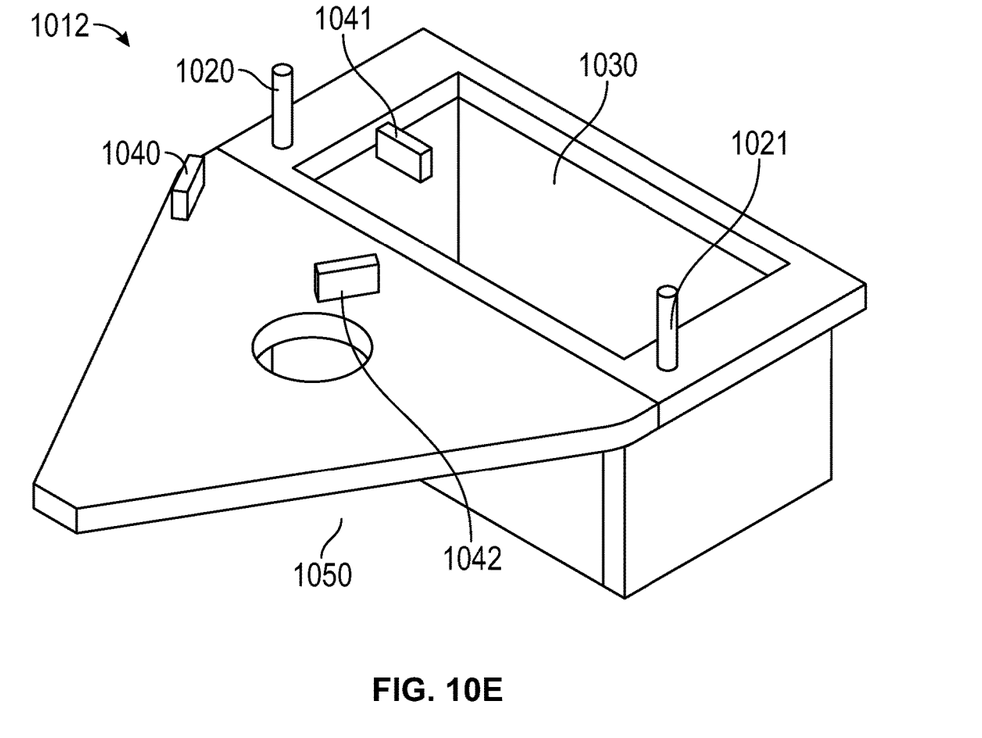

As shown in FIGS. 10C and 10D, panel 1010 is also configured to swing outwardly, when authorized, into an access position that permits access to the machine. In yet another embodiment, as shown in FIG. 10E, container 1030 is removeable so as to allow access to printer components, which may be located in area 1050. Posts 1040-1042 may also support the printing bed.

Figure 11A:
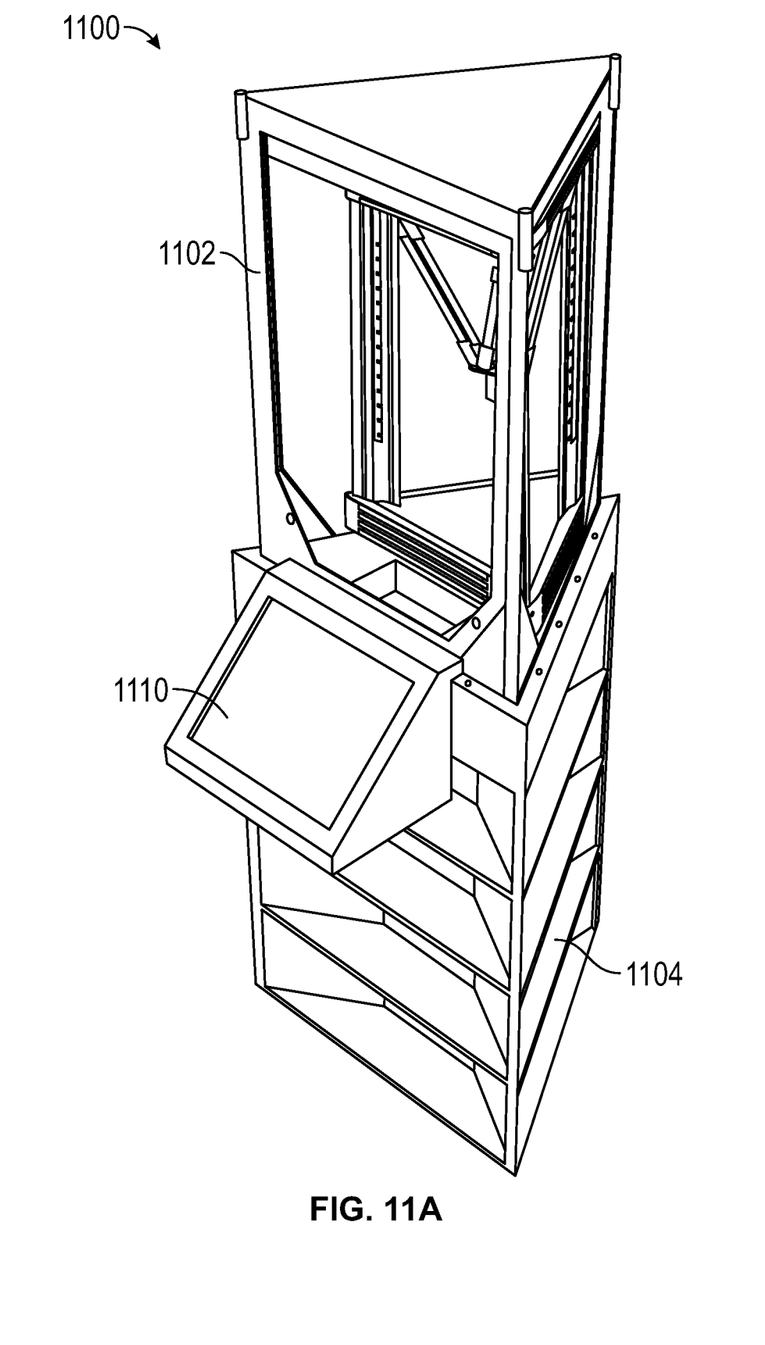
FIGS. 11A-11C illustrate how the modular units of the present invention may be configured into different various arrangements.
Figure 11B:
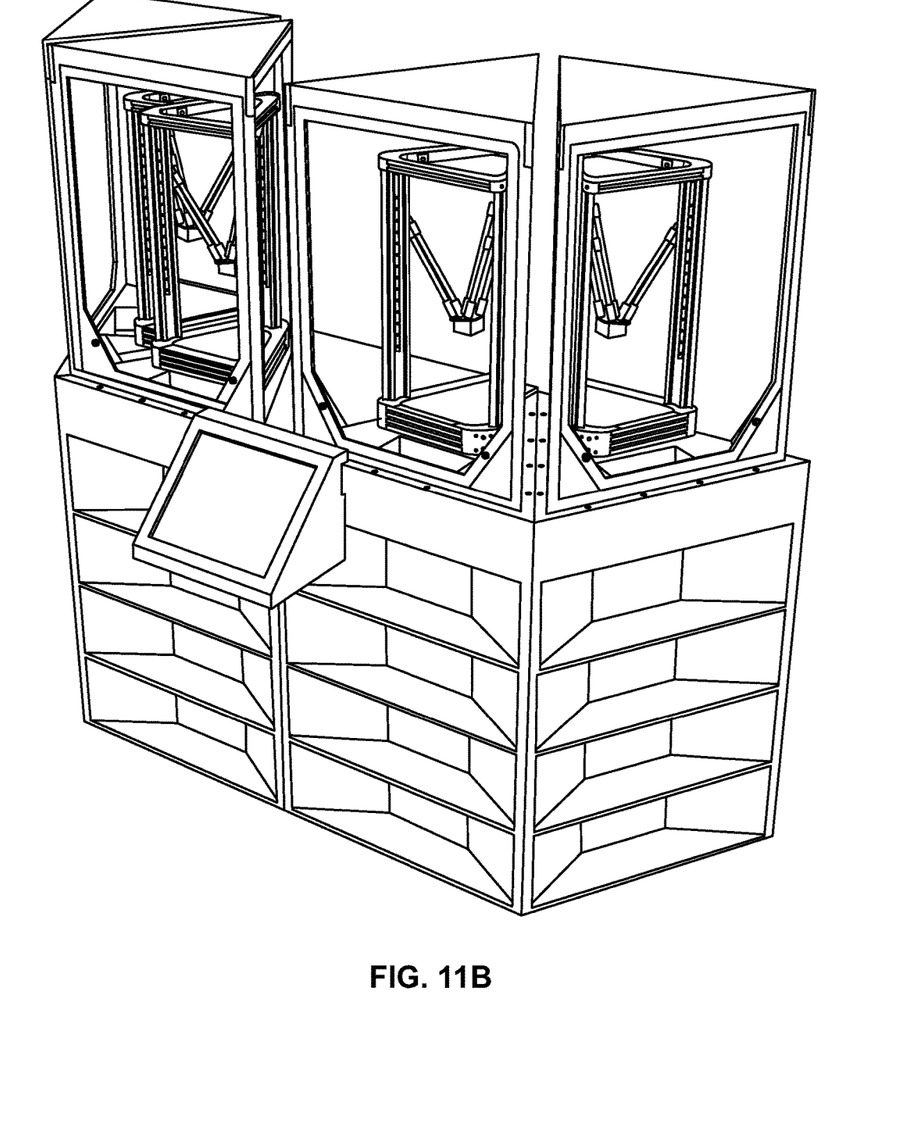
Figure 11C:
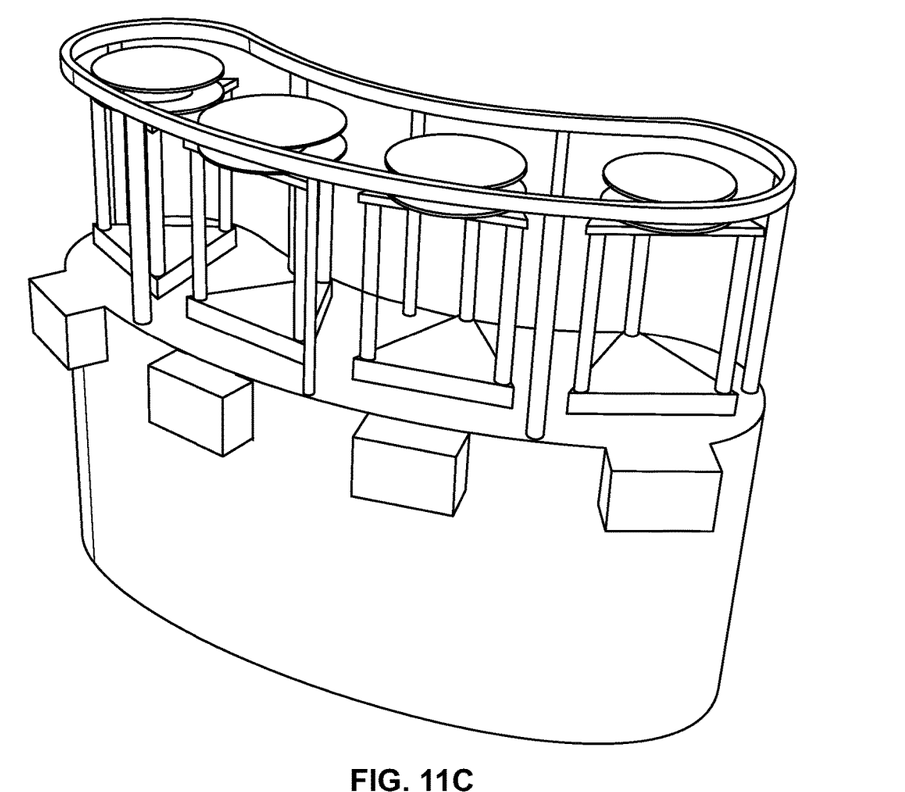

FIGS. 11A-11C illustrate how modular units of the present invention may be configured into different patterns. FIG. 11A shows a modular unit 1100 which consist of printer unit 1102 that is removable from base 1104. An interface 1110 may be provided as well.

As shown in FIGS. 11B and 11C, the modular units may be grouped together in various configurations that maximize the forward or user presenting areas. The ejection systems described above, and particularly ejection system shown in FIG. 1, are useful with these designs.

Figure 12A:
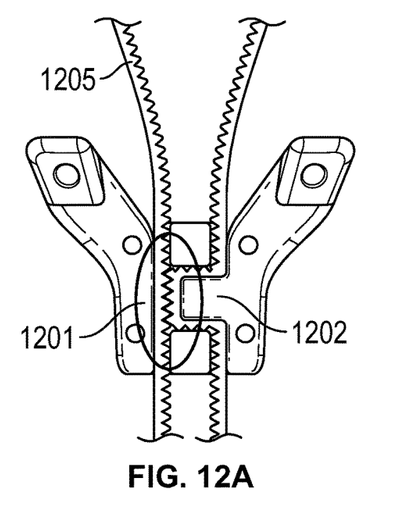
FIGS. 12A-12B illustrate a carriage mechanism that may be used with an embodiment of the present invention.

FIG. 12A shows a prior art carriage design that is used with a continuous belt used to position the printer head. As shown, a linear belt path 1201 and a serpentine path 1202 are provided. As configured, there is contact between the opposite moving portions of the belt 1205 as shown by the encircled area of FIG. 12A. The result of this belt-to-belt contact causes jamming.

Figure 12B:
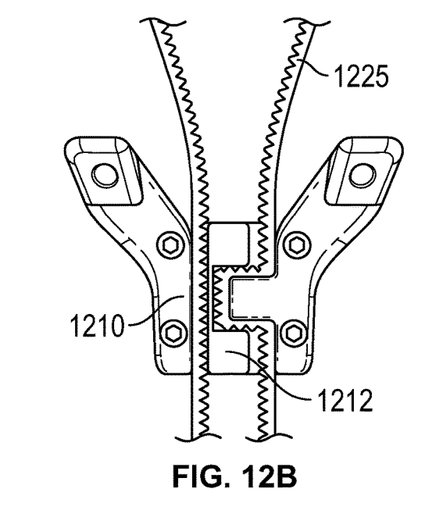

FIG. 12B shows, how in one embodiment of the present invention, an improved carriage is provided. As shown, a linear belt path 1210 is spaced apart from serpentine path 1212 such that there is no contact between the moving portions of belt 1225.

Figure 13:
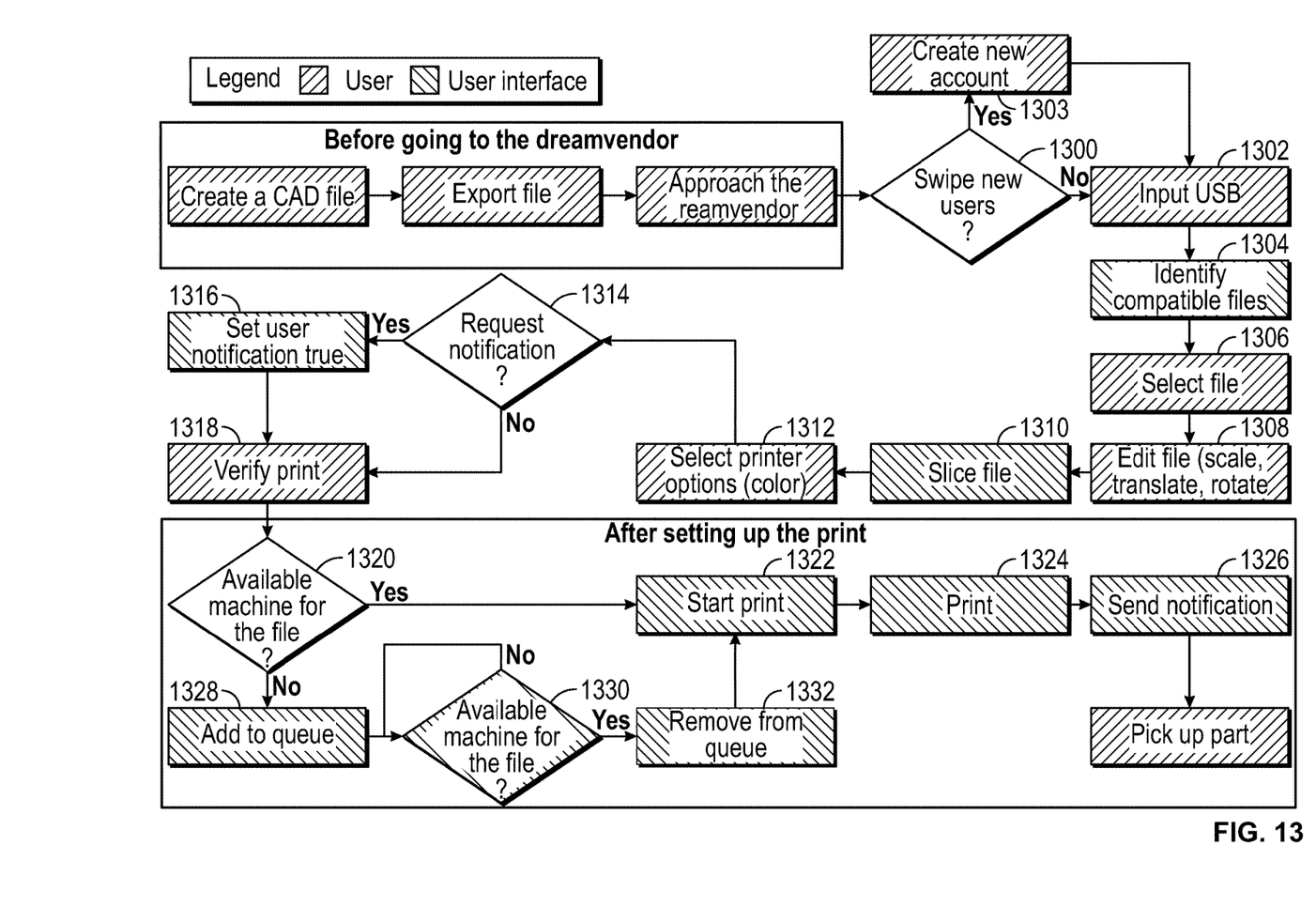
FIG. 13 is a flowchart of a user interface of an embodiment of the present invention that shows the general steps the user and computer perform to start and complete a print job.

The present invention also provides a user interface that follows the general steps set forth in FIG. 13. Specifically, the interface starts on an idle screen, called the "dashboard," which shows any and all identified connected 3D printers, along with their identifying information and current status (idle, some percentage through printing, etc.). The dashboard allows a user to tap on any identified printer to see more detailed information about it, including a button to stop the hardware. The dashboard may also show a 3D model of the part that is being printed, temperatures of the printer, and other predetermined information.

The dashboard allows for multiple paths to be taken through the interface. In one embodiment, a path is provided that allows a user to go through the process of selecting a part to print by first swiping an identification card (step 1300). If a known user, the dashboard prompts the user to load a print file which may be done using a removable USB media or tap an area in the corner of the screen (step 1302). Alternately, step 1302 may initiate the process so that both actions take the user to a step which requests that they identify themselves (step 1300).

Identification may be accomplished by using a readable card, password, other indicia or creating a new account (step 1303) that may include providing identifying information such as the user's name and email address. This information may be saved to the hard drive of the device running the interface.

Proceeding with the process, the system once it receives a print file, checks to make sure it is in a compatible format (step 1304). The user is then prompted to select a 3D model in *.stl format to print (step 1306). After selecting a part from a list, a live preview of the model is shown (using an existing, free software library called Helix 3D Toolkit), rendered on a virtual print bed that replicates the physical one. The user is then allowed to scale, translate, and rotate their part on the virtual bed, replicating how it will look when physically printed (step 1308).

After this point, the model is "sliced" (using open-source software called Slic3r), and code is generated which tells the printer how to move its hardware in order to print the part as shown by the system (step 1310). Next, the interface presents the user with a choice of colors, based on the colors used by the currently connected printers (step 1312). The user taps a color (or selects an option saying they don't care about the color) to request that their model be printed in that color. The user then is asked to confirm their model and color selection, and is asked if they would like to be notified when their print is complete (step 1314). The system then verifies that it has the necessary information to provide the requested notification (step 1316). Finally, a user is prompted to verify the print job (step 1318).

Alternatively, from the dashboard screen, the user can tap a button requesting information on what the interface and hardware is, at which point a few paragraphs will open in a dialog box with the option for the user to enter their email to receive additional information.

Lastly, tapping one of the logos on the dashboard screen generates a prompt for the user to enter a password to continue. Upon a successful password entry, the user will be brought to a screen with access to more fine-grained control over each individual printer, including options to move each of the individual motors, set the color associated with a printer, and send it any command it will recognize, etc. This page is intended to be accessed only by users declared as "maintainers" of the system, and thus is the reason for a password.

Once a print job is verified, the system determines if an appropriate printer is available (step 1320). If yes, the job is sent to the printer to be printed (step 1322). When the printer is finished, it may email the user, notifying them of their completed part, if they had requested to be notified (steps 1324 and 1326).

If a printer is not available, it is sent to a "queue" (step 1328), which refers to a list of print jobs, along with their associated information (3D model, printer instructions, requested color, etc.) sorted in order of creation of the print job.

Whenever a job is added to the queue or a printer is finished printing, each print job in the queue is looked at, starting with the oldest, to see if a printer is available that is printing with the color requested in the job (step 1330). If there is a color match, the job is removed from the queue (step 1332) and is sent to the printer to be printed (step 1322). When the printer is finished, it will email the user, notifying them of their completed part, if they had requested to be notified (steps 1324 and 1326). Matching print job colors with printers using the specified color improves efficiency by avoiding the down time needed to change the color used by a printer.

Other functionality may include allowing users to view the parts in the queue, get an estimated wait time, and remove their own part from the queue and/or replace it with another. Additionally, the queue may be capped at a certain number of jobs, or turned off altogether.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A system for fabricating a three-dimensional object comprising:
   a build platform defining a build area and having a print bed within said build area;
   an extruder that extrudes build material;
   an ejector, said ejector having at least one arm having two opposing ends, said first end adapted to travel in a vertical direction and said second end adapted to travel in a horizontal direction and having a scraper portion; and
   said scraper portion extends horizontally, parallel to said print bed from a retracted position to an extended position when said first end travels in a vertical direction towards said print bed.

2. The system of claim 1 wherein said scraper is comprised of a fixed portion that is attached to a moveable portion, said moveable portion maintains constant physical contact with said print bed.

3. The system of claim 1 wherein said scraper portion extends beyond said build area and said moveable portion of said scraper rotates into a vertical position.

4. The system of claim 1 wherein said first end of said arm remains outside of said build area when traveling vertically and said second end of said arm remains within said build area when traveling horizontally.

5. The system of claim 1 wherein said build platform is a Delta style platform having three posts, said ejector attached to one of said posts, and said first end of said arm is located a spaced distance away from an outer edge of said post above said second end and said second end of said arm is located a spaced distance away from an inner edge of said post below said first end.

6. The system of claim 1 wherein said build platform is a Delta style platform having a plurality of posts and said ejector is comprised of rotatable screw connected to a follower and opposingly located bases, said screw moves said follower in a vertical direction between said bases;
  said opposingly located bases attached to an outer edge of a post and position said screw parallel to an outer edge of said post;
  said ejector further including a plurality of spaced apart arms having first and second ends;
  said first ends located a spaced distance away from an outer edge of said post, above said second ends and connected to said follower;
  said second ends of said arms located a spaced distance away from an inner edge of said post below said first arms;
  said arms defining an opening in which said post is located;
  said scraper portion connected to said second ends of said arms; and
  said scraper portion extends horizontally, parallel to said print bed from a retracted position to an extended position when said follower and said first ends travel in a vertical direction towards said print bed and said second ends extends away from said post in a horizontal direction parallel to said print bed.

7. The system of claim 5 wherein said Delta style platform includes one moveable panel positionable between a closed position, a part retrieval position and an access position;
  in said closed position, said panel is locked in a vertical position;
  in said open position said panel is positioned inwardly towards said build area to permit access to a part container while preventing access to said build area; and
  in said access position, said panel is positioned outwardly away from said build area to permit access to said build area.

8. The system of claim 6 wherein said Delta style platform includes one moveable panel positionable between a closed position, a part retrieval position and an access position;
  in said closed position, said panel is locked in a vertical position;
  in said open position said panel is positioned inwardly towards said build area to permit access to a part container while preventing access to said build area; and
  in said access position, said panel is positioned outwardly away from said build area to permit access to said build area.

9. The system of claim 1 further including a controller and a plurality of build platforms with at least two build platforms configured to use different colored build materials; and
  said controller operatively connected to send print jobs to a build platform based on a match between the color selected for the print job and the color of the build material being used by the build platform.

10. The system of claim 8 further including a controller and a plurality of build platforms with at least two build platforms configured to use different colored build materials; and
  said controller operatively connected to send print jobs to a build platform based on a match between the color selected for the print job and the color of the build material being used by the build platform.

11. The system of claim 10 wherein said controller is configured to send a print job to a queue when a build platform is not available.

12. The system of claim 11 wherein said controller is configured to send the oldest print job in the queue to a first available build platform.

13. A system for fabricating a three-dimensional object comprising:
  a build platform defining a build area, said build platform is a Delta style platform having three posts;
  a print bed within said build area;
  an extruder that extrudes build material;
  an ejector;
  said ejector attached to at least one of said posts of said build platform; and
  said ejector including a scraper that extends parallel to said print bed from a retracted position to an extended position, said scraper is comprised of a fixed portion that is attached to a moveable portion, said moveable portion maintains constant physical contact with said print bed.

14. The system of claim 13 wherein said build platform is a Delta style platform, said Delta style platform includes one moveable panel positionable between a closed position, a part retrieval position and an access position;
  in said closed position, said panel is locked in a vertical position;
  in said open position said panel is positioned inwardly towards said build area to permit access to a part container while preventing access to said build area; and
  in said access position, said panel is positioned outwardly away from said build area to permit access to said build area.

15. The system of claim 14 further including a controller and a plurality of build platforms with at least two build platforms configured to use different colored build materials; and
  said controller operatively connected to send print jobs to at least one of said build platforms based on a match between the color selected for the print job and the color of the build material being used by the build platform.

16. The system of claim 15 wherein said controller is configured to send a print job to a queue when a build platform is not available.

17. The system of claim 16 wherein said controller is configured to send the oldest print job in the queue to a first available build platform.

18. A system for fabricating a three-dimensional object comprising:
  a build platform defining a build area and having a print bed within said build area;
  an extruder that extrudes build material;
  an ejector, said ejector having at least one arm having two opposing ends, said first end adapted to travel in a vertical direction and said second end adapted to travel in a horizontal direction and having a scraper portion;
  said scraper portion extends horizontally, parallel to said print bed from a retracted position to an extended position when said first end travels in a vertical direction towards said print bed; and
  an x-y-z positioning assembly adapted to three-dimensionally position said extruder within said build area.

19. The system of claim 13 further including an x-y-z positioning assembly adapted to three-dimensionally position said extruder within said build area.

20. The system of claim 13 further including at least one channel for the circulation of a cooling and heating fluid in said bed.

* * * * *